United States Patent
Yasui et al.

(10) Patent No.: US 7,123,067 B2
(45) Date of Patent: Oct. 17, 2006

(54) VOLTAGE-CHANGE CONTROL CIRCUIT AND METHOD

(75) Inventors: Yukihiro Yasui, Kanagawa (JP); Takaichi Hirata, Kanagawa (JP); Tsutomu Haruta, Kanagawa (JP)

(73) Assignee: Sony Corporation, (JP)

( * ) Notice: Subject to any disclaimer, the term of this patent is extended or adjusted under 35 U.S.C. 154(b) by 0 days.

(21) Appl. No.: 10/443,790

(22) Filed: May 23, 2003

(65) Prior Publication Data

US 2004/0017247 A1    Jan. 29, 2004

(30) Foreign Application Priority Data

May 28, 2002    (JP)    ............................ P2002-153600

(51) Int. Cl.
G05F 1/575    (2006.01)
H03K 7/02    (2006.01)

(52) U.S. Cl. .................. 327/178; 327/536; 327/544; 363/59

(58) Field of Classification Search ................. 327/178, 327/179, 180, 536, 537, 544; 363/59, 60; 365/189.09, 227

See application file for complete search history.

(56) References Cited

U.S. PATENT DOCUMENTS 6,002,599 A * 12/1999 Chow .......................... 363/59
6,188,590 B1 * 2/2001 Chang et al. ................. 363/60
6,278,315 B1 * 8/2001 Kim ............................ 327/536

FOREIGN PATENT DOCUMENTS

JP    2001231249 B1    8/2001

* cited by examiner

*Primary Examiner*—Timothy P. Callahan
*Assistant Examiner*—Terry L. Englund
(74) *Attorney, Agent, or Firm*—Rader, Fishman & Grauer PLLC; Ronald P. Kananen (57) ABSTRACT

In a charge-pump booster circuit, the control clock is controlled on a small-step basis to thereby suppress the boost amplitude and the occurrence of various noises. Provided are a charge-pump booster circuit section for boosting an external power voltage in absolute value level, a boost-voltage feedback section for controlling the booster circuit section, and a clock buffer section. In the boost-voltage feedback section, an output level of the booster circuit section is detected by a voltage detecting section. This is compared with a reference level, and depending upon the comparison result, a count operation is made in an up/down counter section. Based on the count value, the control amount is shifted on a small-step basis from the D/A converter section, thereby controlling the power voltage of the clock buffer section 300 through the level shifter section.

17 Claims, 5 Drawing Sheets

VOLTAGE-CHANGE CONTROL CIRCUIT AND METHOD

BACKGROUND OF THE INVENTION

1. Technical Field of the Invention

This invention relates to a voltage-change control circuit and electronic apparatus (e.g. camera) including such a voltage-change control circuit.

2. Description of the Related Art

Conventionally, there is known a charge-pump booster circuit used in generating a write/erase voltage to/from a flash memory, for example, or on a high-voltage generating circuit for a liquid-crystal display on a video camera, digital camera or the like.

The charge-pump booster circuit has a series connection of a plurality of stages of pumping packets, each configured by one capacitor and diode, to generate a voltage higher than, e.g., a power voltage $V_{DD}$ of an LSI chip by boosting the voltage in each pumping packet (note that boosting in this case means a boosting in absolute value level, i.e. positively boosting for a positive polarity of power voltage, and negatively boosting for a negative polarity of power voltage).

In addition, the charge-pump booster circuit encounters a noise problem (pumping noise) which occurs when driving a clock buffer for a pumping clock or a pumping capacitor during a pumping operation.

For this reason, the pumping noise of a booster circuit has an effect upon the analog signal of an imaging device, for example. Thus, there is a concern with respect to image noise appearing over an imaging screen or a variation in write distribution under the influence of pumping noise during writing a flash memory or the like.

Figure 4:
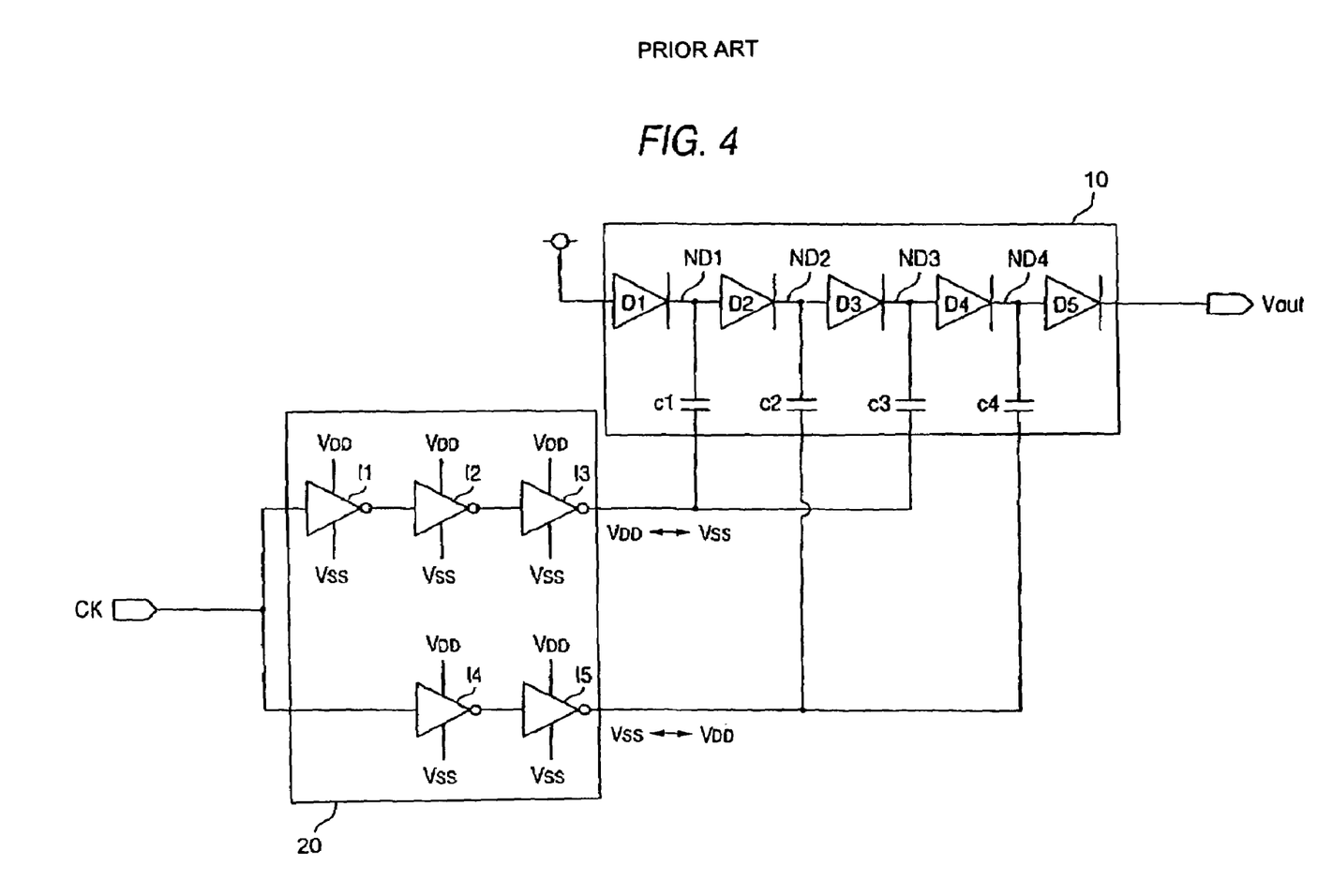
FIG. 4 is a block diagram showing a configuration example of a general booster circuit.

FIG. 4 is a block diagram showing the general configuration example of a booster circuit. As shown in the figure, the booster circuit has a charge-pump booster circuit section 10 configured by capacitors C1–C4 and diodes D1–D5 and a clock buffer section 20 configured by a plurality of inverter-type buffer amplifiers I1–I5. Note that, in each inverter-type buffer amplifier I1–I5, $V_{DD}$ represents a power-sided voltage while $V_{SS}$ represents a ground-sided voltage.

In the booster circuit thus configured, when a clock signal is inputted, e.g. to the capacitor C1, the voltage at a node ND1 is boosted in an amount of voltage $V_{DD}$ (ideal value) by the capacitance coupling of the capacitor C1.

The voltage (V1) at ND1 at that time, if ideally considered, is:

$$V1 = V_{DD} + \alpha$$

where α is the initial potential at the node ND1.

Herein, the initial potential a differs, between the nodes ND1–ND4, depending upon the threshold voltage change, the initial state or the like of the diodes D1–D4. However, the boost voltage is common to $V_{DD}$.

The $V_{DD}$ provides a change amount of boost voltage, which varies at a step $V_{DD}$ before a desired boost voltage is reached.

Incidentally, in the foregoing explanation relates to boosting up the positive polarity of voltage. However, when boosting down a negative polarity of voltage in absolute value level, the voltage at each node ND1–ND4 is boosted down by a similar clock buffer.

In the conventional booster circuit, however, when boosting up or down for the capacitor of booster circuit by the use of a clock having a $V_{DD}$ voltage width, a potential change of $V_{DD}$ step ($V_{DD}$–$V_{SS}$) takes place even at a point close to the desired potential. Even if controlled by a regulator, the potential will vary based on the $V_{DD}$ step.

Meanwhile, driving the capacitor and clock buffer section on the $V_{DD}$ voltage causes useless power, having an effect as a great noise source.

Furthermore, boost voltage cannot be controlled without using a potential change of $V_{DD}$ width=$V_{DD}$ step.

Accordingly, it is desired to control voltage on a small step basis to thereby suppress boost-voltage variation, and further to reduce the noise upon boosting up or down for the capacitor as well as the noise due to the clock buffer.

Therefore, it is an object of the present invention to provide a voltage-change control circuit and method capable of controlling, on a small-step basis, the control clock on the booster circuit, thereby suppressing the occurrence of various noises.

SUMMARY OF THE INVENTION

A voltage-change control circuit according to the present invention, for achieving the foregoing purpose, comprises:

a booster circuit section for boosting an input voltage; a drive circuit section for supplying a driving clock to the booster circuit section;

a voltage detecting section for detecting a level of a boost voltage outputted from the booster circuit section; and a control circuit section for changing a clock amplitude of the drive circuit section in accordance with a detection result by the voltage detection section.

Meanwhile, a voltage-change control method according to the invention is for a booster circuit having a booster circuit section for boosting an input voltage and a clock buffer section for supplying a driving clock to the booster circuit section thereby holding a voltage generated by the booster circuit section at a predetermined level, the voltage-change control method comprising the steps of:

detecting a level of a boost voltage outputted from the booster circuit section;

shifting, on a small step basis, a control amount for varying a clock amplitude of the clock buffer section correspondingly to a result of the detection; and supplying a feedback signal corresponding to the control amount to the clock buffer section thereby controlling the clock amplitude of the clock buffer section.

Meanwhile, an electronic apparatus according to the invention comprises:

a booster circuit section for boosting an input voltage;

a drive circuit section for supplying a driving clock to the booster circuit section;

a voltage detecting section for detecting a level of a boost voltage outputted from the booster circuit section; and a control circuit section for changing a clock amplitude of the drive circuit section in accordance with a detection result by the voltage detection section.

Meanwhile, a camera according to the invention comprises:

a booster circuit section for boosting an input voltage;

a drive circuit section for supplying a driving clock to the booster circuit section;

a voltage detecting section for detecting a level of a boost voltage outputted from the booster circuit section;

a control circuit section for changing a clock amplitude of the drive circuit section in accordance with a detection result by the voltage detection section; and an imaging device.

DESCRIPTION OF THE PREFERRED EMBODIMENT

Explanation will be now made of an embodiment of a voltage-change control circuit and method according to the present invention.

Figure 1:
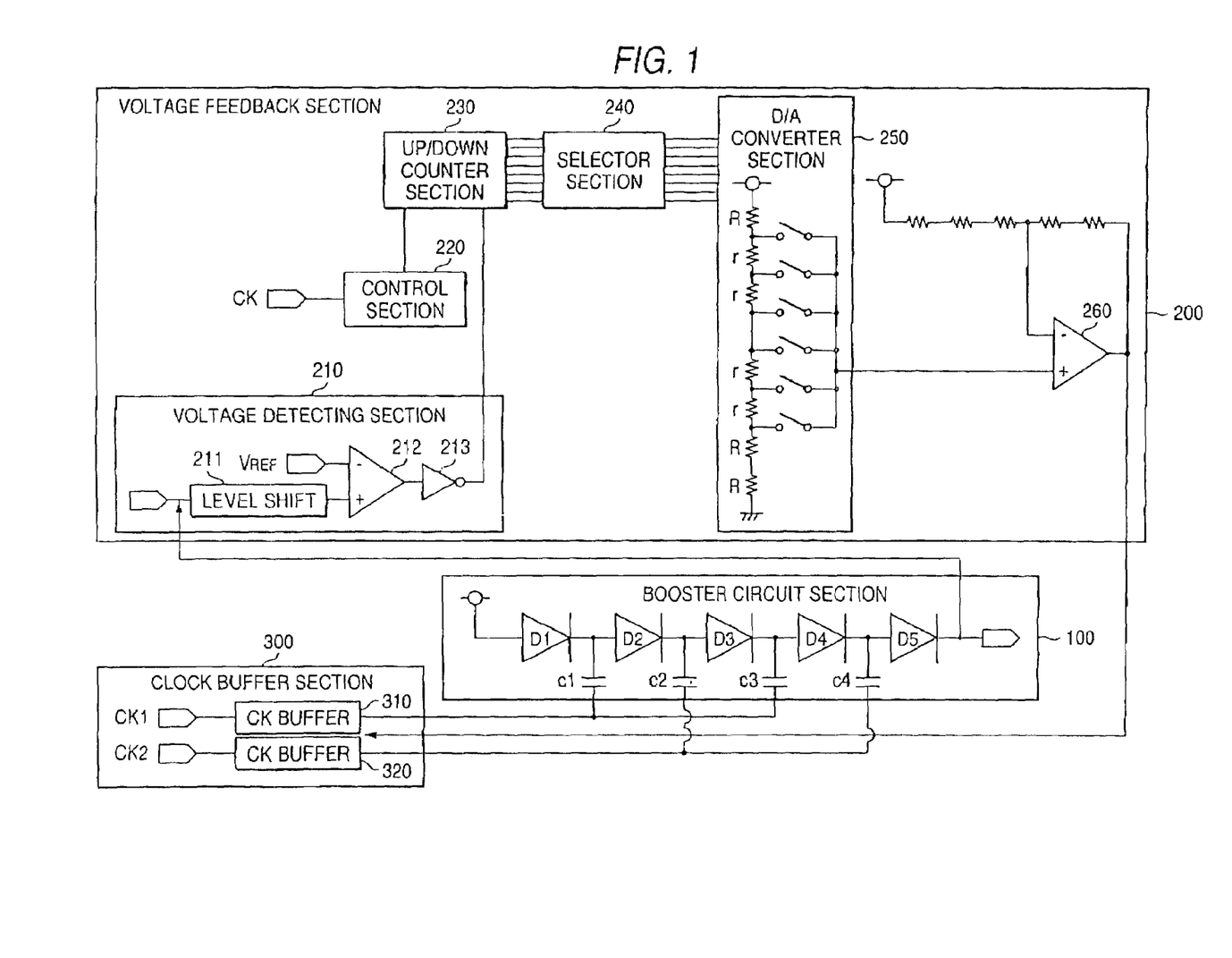
FIG. 1 is a block diagram showing a configuration example of a booster circuit to which is applied a voltage-change control circuit according to an embodiment of the present invention.

FIG. 1 is a block diagram showing a configuration of a booster circuit to which is applied a voltage-change control circuit according to an embodiment of the invention.

The booster circuit includes a booster circuit section 100 for boosting an external power voltage in absolute value level, boost-voltage feedback section 200 for controlling the booster circuit section 100, and a clock buffer section 300.

The booster circuit of this embodiment is characterized in that a D/A converter is used as a control-amount determining section of the boost-voltage feedback section 200 and that boost potential is controlled by controlling the power voltage to the clock buffer section 300.

Explanation will now be made of the configuration of the booster circuit of this embodiment.

At first, the configuration of the booster circuit section 100 is in a general form employing, for example, a charge-pump booster circuit configured with capacitors C1–C4 and diodes D1–D5 similarly to the booster circuit section 10 shown in FIG. 4.

The voltage feedback section 200 is configured with a voltage detecting section 210, a control section 220, an up/down counter section 230, a selector section 240, a D/A converter section 250, a level shifter section 260 and so on.

The voltage detecting section 210 is to monitor an output voltage level of the booster circuit section 100, and has a level shift circuit 211, a comparator 212 and an inverter 213. The output voltage level of the booster circuit section 100 is shifted to a proper level by the level-shift (resistance divisional voltage) circuit 211, which level after shift is compared with a reference voltage level VREF by the comparator 212. The comparison result (0 (=L) at high boost level, or 1 (=H) at low boost level) is outputted to the up/down counter section 230 through the inverter 213.

The control section 220 is to control the count operation of the up/down counter section 230 depending upon an operation clock CK. The up/down counter section 230 counts, up to 8 bits in maximum, the comparison result (0 or 1 (L or H)) from the voltage detecting section 210, to thereby output a count value to the D/A converter section 250 through the selector section 240 having an 8-bit width.

The D/A converter section 250 inputs therein a count value of an 8-bit binary number (i.e. representative of 256 step levels) and outputs an analog signal commensurate with a count value (control amount to change the clock amplitude of the clock buffer section 300 through the selector section 240). This generates an analog signal (control amount), in any of 256 levels, responsive to an output of the booster circuit section 100. Incidentally, the difference of one step in the analog signal is referred to as a "digit".

The level shifter section 260 outputs a voltage signal shifted at a proper level as a feedback voltage to the clock buffer section 300 on the basis of an output of the D/A converter section 250.

Figure 2:
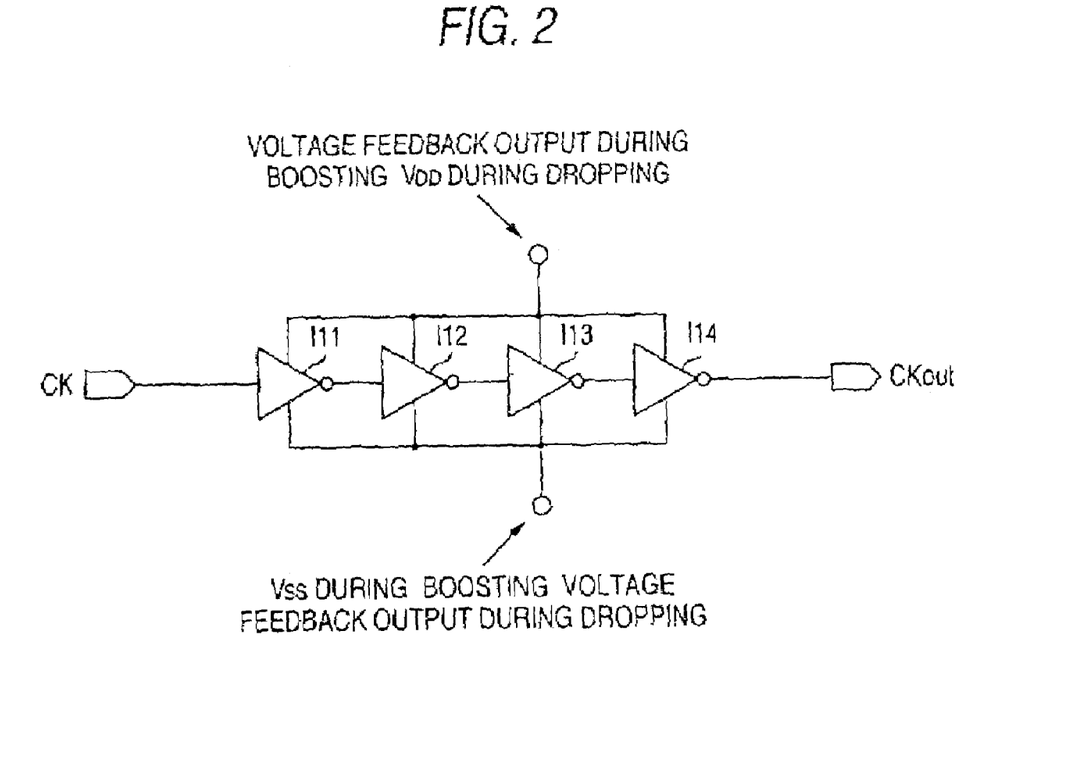
FIG. 2 is a block diagram showing a configuration example of a clock buffer section of the voltage-change control circuit of FIG. 1.

The clock buffer section 300 is configured by clock buffers 310, 320 having a configuration, basically, similar to the clock buffer section shown in FIG. 4. However, as shown in FIG. 2, the inverter-type buffer amplifiers I11–I14 configuring the clock buffer have a power-sided voltage $V_{DD}$ or ground-sided voltage $V_{SS}$ to be variably controlled by a feedback voltage of the level shifter section 260.

For example, in the case where the power voltage is positive in polarity to boost an input voltage, the feedback voltage from the level shifter section 260 is connected to the clock buffer section 300 at its power source side so that, in a state where the ground-sided voltage $V_{SS}$ is fixed at a predetermined value, the potential of the power-sided voltage $V_{DD}$ is caused to vary by the feedback voltage.

This results in an output, from the clock buffer section 300, of a clock signal having an L level of 0V and an H level of arbitrary voltage (any of 256 step-level voltages equal to or lower than $V_{DD}$), making it possible to desirably change a voltage step in boosting.

Figure 5:
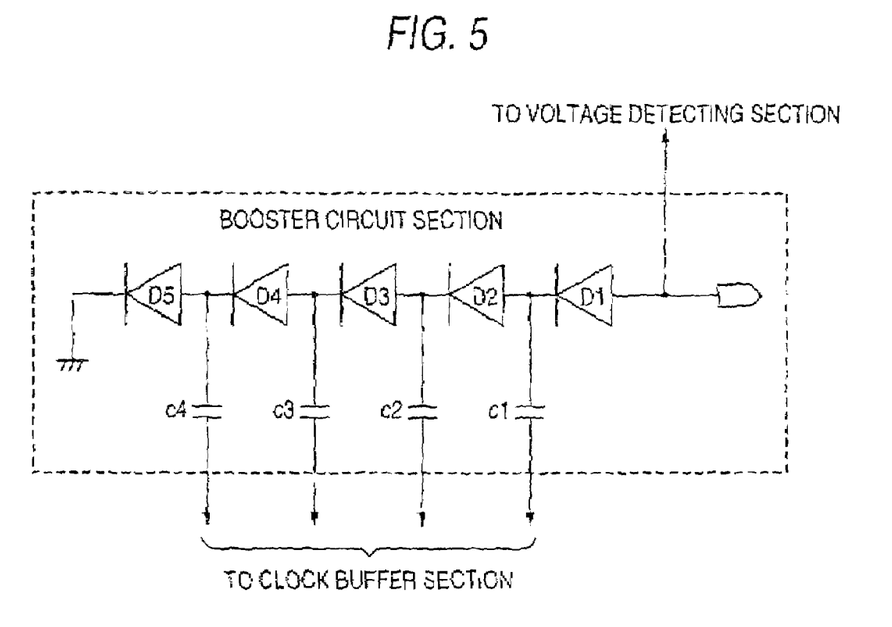
FIG. 5 is a block diagram showing another configuration example of a booster circuit section of the voltage-change control circuit of FIG. 1.

Meanwhile, FIG. 5 is a block diagram showing a configuration example of a booster circuit section where the circuit of FIG. 1 is used as a voltage drop circuit (negatively boosting circuit).

In the case where the input voltage (negative boost) is dropped, the booster circuit section is configured as shown in FIG. 5. Furthermore, the feedback voltage of the level shifter section 260 is connected to the clock buffer section 300 at its ground side so that, in a state where the power-sided voltage $V_{DD}$ is fixed at a predetermined value, the potential of the ground-sided voltage $V_{SS}$ is caused to vary by the feedback voltage.

This results in an output, from the clock buffer section 300, of a clock signal having an H level of a predetermined power voltage $V_{DD}$ and an L level of arbitrary voltage (any of 256 step-level voltages, equal to or lower than $V_{DD}$), making it possible to desirably change a voltage step in boosting down.

Namely, by changing the booster circuit section and feedback-voltage connecting structure depending upon a required polarity of voltage, application is made feasible to a power circuit that is nearly similar in circuit configuration but different in polarity.

Incidentally, although the example of FIG. 1 showed shows two clocks (CK1, CK2) deviated in phase, this has no direct bearing on the feature of the invention and, hence, explanation thereof will be omitted.

Figure 3:
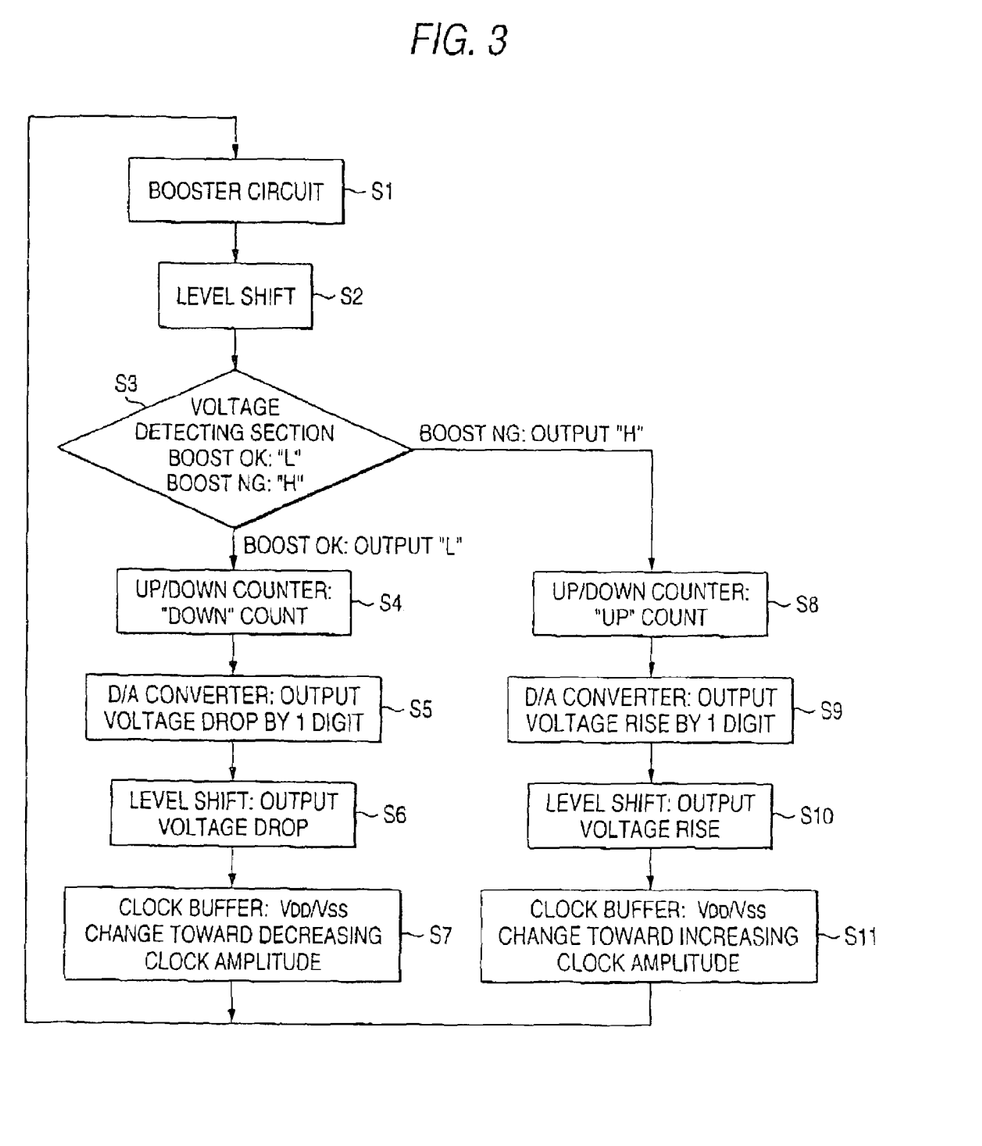
FIG. 3 is a flowchart showing an operation example of the voltage-change control circuit of FIG. 1.

FIG. 3 is a flowchart showing an operation example of the voltage-change control circuit, when positively boosted, of this embodiment.

If the boost level is higher (boosting OK), a comparison result signal 0 (L) is outputted to the up/down counter section 230, to cause a down-count in the up/down counter section 230 (step S4).

This reduces the output voltage of the D/A converter section 250 by one step (1 digit) (step S5), correspondingly reducing the level shift output voltage (feedback voltage) due to the level shifter section 260 (step S6).

Accordingly, the power-sided voltage $V_{DD}$ or ground-sided voltage $V_{SS}$ in the clock buffer section 300 is changed by the feedback voltage from the level shifter section 260, thus controlled toward reducing the clock amplitude (step S7).

Meanwhile, if the boost level is lower in the step S3 (boosting NG), a comparison result signal 1 (H) is outputted to the up/down counter section 230, to cause an up-count in the up/down counter section 230 (step S8).

This raises the output voltage of the D/A converter section 250 by one step (1 digit) (step S9), correspondingly raising the level shift output voltage (feedback voltage) due to the level shifter section 260 (step S10).

Accordingly, the power-sided voltage $V_{DD}$ or ground-sided voltage $V_{SS}$ in the clock buffer section 300 is varied by the feedback voltage from the level shifter section 260, thus controlled toward increasing the clock amplitude (step S11).

Thereafter, the process returns to step S1 to repeat the operation in the booster circuit section 100.

Incidentally, JP-A-2001-231249, for example, proposes a method to change the clock signal amplitude.

However, this references discloses boost capacitors connected in series to obtain an amplitude at $V_{DD}$ or smaller. In such a method, because the voltage step width is nearly 0.5 $V_{DD}$, the step width is coarser than that of the present invention. Meanwhile, in order to realize a step width of 0.5 $V_{DD}$ or smaller, a number of capacitors are required. For realizing the multi-level steps, which total as many as 256 levels by the combinations of capacitors as explained in the embodiment of the invention, there is a need of a number of boost capacitors to greatly increase the layout area, thereby making realization thereof non-practical.

In this respect, the present invention can change clock signal amplitude by multi-level steps through a simplified configuration, obtaining a quite effective operational effect.

With the voltage-change control circuit according to the foregoing present embodiment, the following operational effect can be enjoyed.

(1) Boost (drop) potential can be controlled with a voltage step smaller than the power voltage $V_{DD}$ in accordance with a level of boost voltage.

(2) Because the drive voltage in the clock buffer section is changed responsive to a boost level, when boost voltage is low, the output amplitude of the clock buffer section can be increased to rapidly carry out boosting. When boost voltage is high, the output amplitude of the clock buffer section can be decreased to suppress any potential change.

(3) By realizing operation state (2) described above, the clock drive amplitude is small when the boost voltage is high (or when the other circuit is in active state). Thus, pumping noise is suppressed to effectively suppress the effect of noise upon the other circuit.

(4) By realizing operation state (2) described above, when the circuit begins to operate, the clock buffer amplitude can be increased in the first dummy cycle to thereby raise a boost voltage. Although pumping noise occurs at this time, there is no problem in practical operation if it is carried out on the dummy cycle.

(5) The use of a drive voltage of the clock buffer section responsive to a boost level raises the circuit efficiency (boost change efficiency), thereby making it possible to reduce power consumption.

(6) In design, because realization is possible by merely changing the control section and power-source section of the clock buffer section of an existing booster circuit, no major modification is required. Contrary to this, in a case similar to a method used to increase the boost capacitors as explained in the foregoing JP-A-2001-231249, the modification to the booster circuit is proper and thus results in major change of layout.

Figure 6:
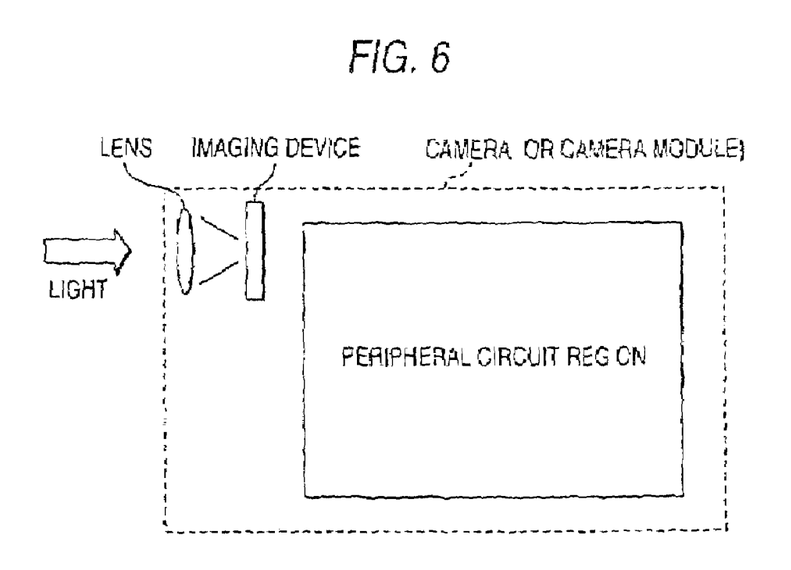
FIG. 6 is a figure showing a camera having a peripheral circuit region including a booster circuit according to an embodiment of the invention.

Incidentally, although the foregoing embodiment explained a case in which the present invention was applied to the voltage-change control circuit single body of the booster circuit, the invention can also be applied to various electronic apparatuses in having such a voltage-change control circuit in a power source section, e.g. a personal computer, personal digital assistant, digital camera, display panel or the like. Low power voltage can be effectively boosted without causing noise in each part. Particularly, in a case where the invention is applied to a voltage-change control circuit included in a peripheral circuit region of a camera including an imaging device (CCD imaging device or amplification type imaging device such as a CMOS sensor) shown in FIG. 6, it is possible to reduce the effect of noise upon the analog signal of the imaging device, and eventually improve the image quality of the camera.

Meanwhile, the camera referred to herein can signify a camera module including an imaging device, a lens and a predetermined peripheral circuit only. In such a case, it is possible to improve the image quality of a product incorporating the camera module.

As explained above, the voltage-change control circuit and method of the present invention detects a level of a boost voltage outputted from the booster circuit, shifts on a small-step basis the control amount for changing the clock amplitude in the clock buffer section correspondingly to a result of the detection, and supplies a feedback signal corresponding to the control amount to the clock buffer section thereby controlling the clock amplitude in the clock buffer section. Accordingly, the clock amplitude for control in the booster circuit section can be controlled on a small-step basis, thereby making it possible to suppress the occurrence of various noises.

Meanwhile, by mounting a similar voltage-change control circuit on an electronic apparatus, effective drive voltage is available in a state such that various noises are suppressed on the electronic apparatus with a low power voltage.

What is claimed is:

1. A voltage-change control circuit comprising:
a booster circuit section for boosting an input voltage;
a drive circuit section for supplying a driving clock to the booster circuit section;
a voltage detecting section for detecting a level of a boost voltage outputted from the booster circuit section; and
a control circuit section for changing a clock amplitude of the drive circuit section in accordance with a detection result by the voltage detection section; wherein
the control circuit section comprises a control amount determining section for shifting a control amount for changing the clock amplitude; and
the control amount determining section has an up/down counter for increasing and decreasing a count value for shifting the control amount to vary the clock amplitude in accordance with the detection result from the voltage detecting section, and a D/A converter for determining the control amount to vary the clock amplitude on the basis of the count value by the up/down counter, and for supplying the control amount to the a level shifter section, said level shifter section supplying a feedback signal to the drive circuit section.

2. A voltage-change control circuit according to claim 1, wherein the drive circuit section includes at least a clock buffer section for holding the boost voltage generated by the booster circuit section at a predetermined level, the control circuit section further comprising the level shifter section for supplying the feedback signal corresponding to the control amount determined by the control amount determining section to the clock buffer section and controlling the clock amplitude.

3. A voltage-change control circuit according to claim 2, wherein the booster circuit section is a charge-pump booster circuit comprising a plurality of stages of pumping packets configured by capacitors and diodes.

4. A voltage-change control circuit according to claim 3, wherein the clock buffer section applies the driving clock to at least one stage of the pumping packets of the booster circuit section, thereby controlling a boost amount in the booster circuit section.

5. A voltage-change control circuit according to claim 1, wherein the voltage detecting section has a comparator for comparing the level of the boost voltage outputted from the booster circuit section with a reference level.

6. A voltage-change control circuit according to claim 2, wherein the level shifter section shifts a voltage level of a power-sided voltage or ground-sided voltage of the clock buffer section by the feedback signal thereby controlling the clock amplitude.

7. A voltage-change control method for a booster circuit having a booster circuit section for boosting an input voltage and a clock buffer section for supplying a driving clock to the booster circuit section thereby holding a boost voltage generated by the booster circuit section at a predetermined level, the voltage-change control method comprising the steps of:

detecting the level of the boost voltage outputted from the booster circuit section;

shifting, on a small step basis, a control amount for varying a clock amplitude of the clock buffer section correspondingly to a result of the detection; and supplying a feedback signal corresponding to the control amount to the clock buffer section thereby controlling the clock amplitude of the clock buffer section;

wherein the step of detecting includes comparing the level of the boost voltage outputted from the booster circuit section with a reference level by a comparator, and the step of shifting includes increasing and decreasing by an up/down counter a count value for shifting the control amount to vary the clock amplitude of the clock buffer section on the basis of a result of the comparison, and determining by a D/A converter the control amount to vary the clock amplitude of the clock buffer section on the basis of the increased or decreased count value.

8. A voltage-change control method according to claim 7, wherein the booster circuit section is a charge-pump booster circuit comprising a plurality of stages of pumping packets configured by capacitors and diodes.

9. A voltage-change control method according to claim 8, wherein the clock buffer section applies the driving clock to at least one stage of the pumping packets of the booster circuit section thereby controlling a boost amount of the booster circuit section.

10. A voltage-change control method according to claim 7, wherein the clock amplitude is controlled by shifting a voltage level of a power-sided voltage or ground-sided voltage of the clock buffer section by means of the feedback signal.

11. An electronic apparatus comprising:
a booster circuit section for boosting an input voltage;
a drive circuit section for supplying a driving clock to the booster circuit section;
a voltage detecting section for detecting a level of a boost voltage outputted from the booster circuit section; and
a control circuit section for changing a clock amplitude of the drive circuit section in accordance with a detection result by the voltage detection section; wherein
the control circuit section comprises a control amount determining section for shifting a control amount for changing the clock amplitude; and
the control amount determining section has an up/down counter for increasing and decreasing a count value for shifting the control amount to vary the clock amplitude in accordance with the detection result from the voltage detecting section, and a D/A converter for determining the control amount to vary the clock amplitude on the basis of the count value by the up/down counter and for supplying the control amount to the a level shifter section, said level shifter section supplying a feedback signal to the drive circuit section.

12. An electronic apparatus according to claim 11, wherein the drive circuit section includes at least a clock buffer section for holding the boost voltage generated by the booster circuit section at a predetermined level, the control circuit section further comprising the level shifter section for supplying the feedback signal corresponding to the control amount determined by the control amount determining section to the clock buffer section and controlling the clock amplitude.

13. An electronic apparatus according to claim 12, wherein the booster circuit section is a charge-pump booster circuit comprising a plurality of stages of pumping packets configured by capacitors and diodes.

14. An electronic apparatus according to claim 13, wherein the clock buffer section applies the driving clock to at least one stage of the pumping packets of the booster circuit section, thereby controlling a boost amount in the booster circuit section.

15. An electronic apparatus according to claim 11, wherein the voltage detecting section has a comparator for comparing the level of the boost voltage outputted from the booster circuit section with a reference level.

16. An electronic apparatus according to claim 12, wherein the level shifter section shifts a voltage level of a power-sided voltage or ground-sided voltage of the clock buffer section by the feedback signal thereby controlling the clock amplitude.

17. A camera comprising:
a booster circuit section for boosting an input voltage;
a drive circuit section for supplying a driving clock to the booster circuit section;
a voltage detecting section for detecting a level of a boost voltage outputted from the booster circuit section;
a control circuit section for changing a clock amplitude of the drive circuit section in accordance with a detection result by the voltage detection section; and
an imaging device connected to an output of the booster circuit section; wherein
the control circuit section comprises a control amount determining section for shifting a control amount for changing the clock amplitude; and the control amount determining section has an up/down counter for increasing and decreasing a count value for shifting the control amount to vary the clock amplitude in accordance with the detection result from the voltage detecting section, and a D/A converter for determining the control amount to vary the clock amplitude on the basis of the count value by the up/down counter and for supplying the control amount to the a level shifter section, said level shifter section supplying a feedback signal to the drive circuit section.

* * * * *